(12) United States Patent
Pagnano et al.

(10) Patent No.: US 6,725,182 B2
(45) Date of Patent: Apr. 20, 2004

(54) SYSTEM AND METHOD FOR MONITORING DEVICES AND COMPONENTS

(75) Inventors: Marco Aurelio de Oliveira Pagnano, Sertaozinho (BR); Alexandre Calura Yamasita, Ribeirao Preto (BR)

(73) Assignee: SMAR Research Corporation, Holbrook, NY (US)

( * ) Notice: Subject to any disclaimer, the term of this patent is extended or adjusted under 35 U.S.C. 154(b) by 63 days.

(21) Appl. No.: 10/209,601

(22) Filed: Jul. 31, 2002

(65) Prior Publication Data

US 2004/0024572 A1 Feb. 5, 2004

(51) Int. Cl.⁷ .............................................. G06F 19/00
(52) U.S. Cl. ....................... 702/188; 702/184; 700/108; 340/635
(58) Field of Search ................................ 702/188, 182, 702/183, 184, 185; 700/108; 340/500, 501, 540, 635

(56) References Cited

U.S. PATENT DOCUMENTS

| | | | | |
|---|---|---|---|---|
| 5,103,409 A | * | 4/1992 | Shimizu et al. | 702/183 |
| 5,521,848 A | * | 5/1996 | Bayne et al. | 702/182 |
| 5,571,007 A | * | 11/1996 | Ishiguro et al. | 431/13 |
| 5,841,654 A | * | 11/1998 | Verissimo et al. | 700/83 |
| 5,867,809 A | * | 2/1999 | Soga et al. | 702/130 |
| 5,903,455 A | * | 5/1999 | Sharpe et al. | 700/83 |
| 5,960,214 A | * | 9/1999 | Sharpe et al. | 710/15 |
| 5,995,916 A | | 11/1999 | Nixon et al. | |
| 6,006,171 A | * | 12/1999 | Vines et al. | 702/184 |
| 6,298,454 B1 | | 10/2001 | Schleiss et al. | |
| 6,326,758 B1 | * | 12/2001 | Discenzo | 318/609 |
| 6,370,448 B1 | | 4/2002 | Eryurek | |
| 6,377,859 B1 | | 4/2002 | Brown et al. | |
| 6,424,930 B1 | * | 7/2002 | Wood | 702/184 |
| 6,434,512 B1 | * | 8/2002 | Discenzo | 702/184 |
| 6,490,543 B1 | * | 12/2002 | Jaw | 702/184 |
| 2002/0143421 A1 | * | 10/2002 | Wetzer | 700/100 |
| 2002/0169514 A1 | * | 11/2002 | Eryurek et al. | 700/110 |
| 2003/0005486 A1 | * | 1/2003 | Ridolfo et al. | 800/288 |
| 2003/0028269 A1 | * | 2/2003 | Spriggs et al. | 700/83 |

OTHER PUBLICATIONS

Allen, C of Fisher–Rosemount, "Intelligent Valves & Actuators", I.E.E. Conference, Dec. 2, 1994.*

* cited by examiner

*Primary Examiner*—Patrick Assouad
(74) *Attorney, Agent, or Firm*—Baker Botts, LLP

(57) ABSTRACT

A system and method for monitoring a device or component are provided. In particular, a controller and/or a field device may be adapted to transmit monitoring data associated with the field device or component to the computer system when an amount of time that the field device has been in operation is greater than a predetermined amount of time. Also, a server can be adapted to access the monitoring data, and to transmit a request to replace the field device and a recommendation for maintenance to be performed on the field device independently from a performance of the field device.

58 Claims, 8 Drawing Sheets

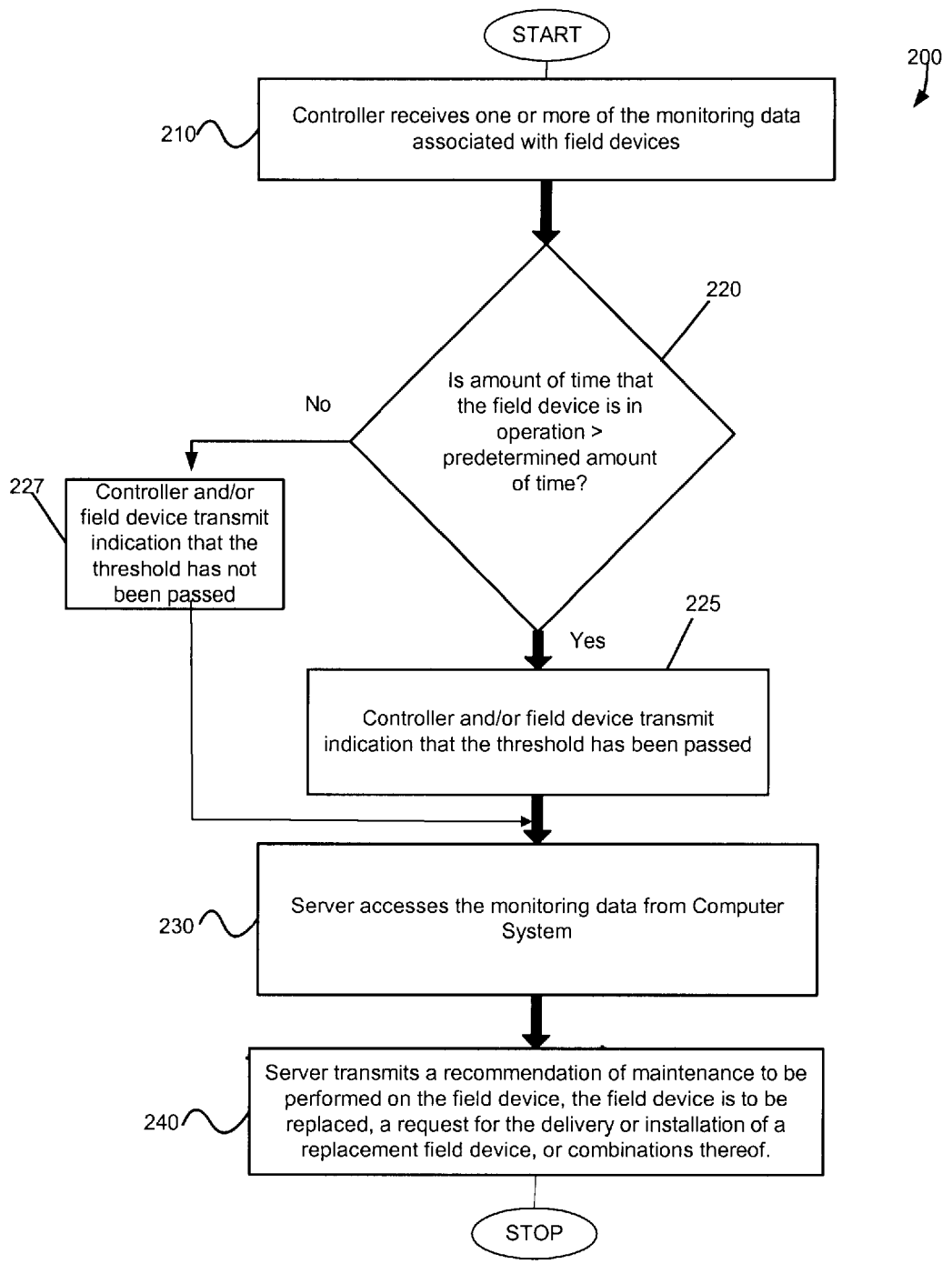

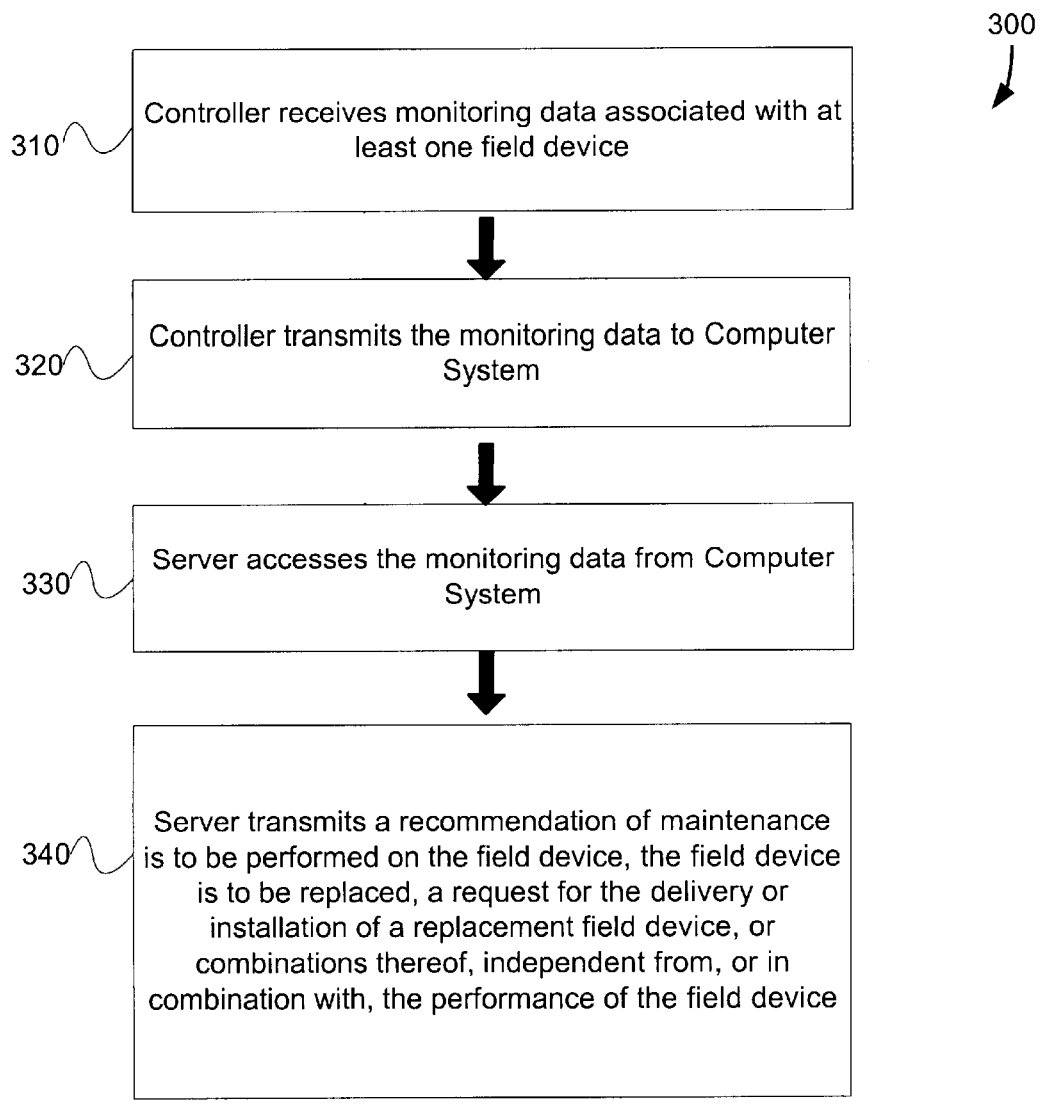

SYSTEM AND METHOD FOR MONITORING DEVICES AND COMPONENTS

FIELD OF THE INVENTION

The present invention relates generally to systems and methods for monitoring devices and components. In particular, the invention is directed to the system and method in which devices and/or components are maintained or replaced.

BACKGROUND OF THE INVENTION

Conventional monitoring systems may include a plurality of field devices, e.g., smart field devices, positioned at various locations on a network. The smart field devices may include a processor, and can be temperature sensors, pressure sensors, flow rate sensors, valves, switches, etc., or combinations thereof. The smart field devices may be communicatively coupled to each other using an open smart communications protocol. Such open smart communications protocols may include HART®, PROFIBUS®, FOUNDATION® Fieldbus, etc. These open smart communications protocol enable smart field devices that are manufactured by different manufactures to be used together in the same process. The conventional systems also may include a controller communicatively coupled to each of the smart field devices using the open smart communications protocol. Moreover the controller may include a processor, and can receive data from each of the smart field devices.

In operation, each smart field device may perform a particular function. For example, a temperature sensor may measure a temperature of a liquid, a pressure sensor may measure pressure within a container, a flow rate sensor may measure a flow rate of the liquid, etc. Similarly, valves and switches may open to allow or increase the flow of the liquid, or may close to stop the flow of the liquid or to decrease the flow rate of the liquid. After the smart field devices obtain measurements of various process parameters, or the valves or switches are opened/closed, the smart field devices may communicate with the controller. For example, the smart field devices may forward the data to the controller, and the controller can implement a control procedure based on the received data.

Moreover, the smart field devices, the controller, or both, may be adapted to detect existing problems associated with the smart field devices. For example, the smart field device can measure instantaneous temperatures and/or instantaneous flow rates of a fluid, and may store the temperatures and flow rates in a database. The smart field devices can also continuously calculate an average fluid temperature or an average fluid flow rate, and compare the most recently measured temperature or flow rate to the average fluid temperature or flow rate, respectively. When the efficiency of the smart field device decreases, the most recently measured temperature or flow rate may be substantially less than or greater than the average temperature or flow rate, respectively. When the smart field device detects this deviation, it forwards the data to the controller, and the controller reports the existence of the problem to a computer system. Subsequently, the smart field device may be replaced and/or maintenance can be performed on the smart field device.

Nevertheless, such systems only depend on the data associated with the performance of the smart field device to determine whether to replace or perform maintenance on the smart field device. Consequently, problems with the smart field device arise before the maintenance is performed on the smart field device, or before the smart field device is replaced, or both.

SUMMARY OF THE INVENTION

Therefore, a need has arisen to provide a system and method for monitoring devices and components which overcome the above-described and other shortcomings of the conventional systems and methods. One of the advantages of the present invention is that data associated with the performance of the field device and/or data collected independent of the performance of the field device can be used to determine whether to replace or perform maintenance on the field device. For example, when the amount of time (that the field device has been in operation) is greater than a predetermined value, this data can be forwarded to a computer system. Consequently, such computer system may instruct the field device to be replaced, or can require maintenance to be performed on the field device before problems arise associated with the field device.

According to an exemplary embodiment of the present invention, a system and method for monitoring a device or component are provided. In particular, a controller is communicatively coupled to at least one field device, and a computer system is communicatively coupled to the controller. For example, the at least one field device may be a smart field device, and the controller may communicate with the smart field device using an open smart communications protocol, e.g., Foundation Fieldbus protocol, PROFIBUS protocol, etc. Moreover, the controller and/or the field device may be adapted to transmit monitoring data associated with the field device to the computer system when an amount of time that the field device has been in operation is greater than a predetermined value. Alternatively, a server may be communicatively coupled to the computer system, such that the server is adapted to access the monitoring data, and transmit a request for a replacement field device and/or a recommendation that maintenance be performed on the field device independent of a performance of the field device.

In another exemplary embodiment of the present invention, the field device may be a temperature sensor, a pressure sensor, a flow rate sensor, a valve, a switch, etc. Also, the monitoring data may include values associated with temperature, pressure, flow rate, the amount of time that the field device has been in operation, a position of the valve, a position of the switch, etc. Moreover, the controller and/or the field device may be adapted to compare an instantaneous temperature, pressure or flow rate with an average temperature, pressure or flow rate, respectively. The controller also may be adapted to transmit the monitoring data to the computer system when the difference between the instantaneous temperature, pressure or flow rate and the average temperature, pressure or flow rate, respectively, is greater than a predetermined value.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

FIG. 2a is a flowchart of a first exemplary embodiment of the method according to the present invention for monitoring the devices and/or component.

FIG. 2b is a flowchart depicting examples of monitoring data which may be transmitted to a controller by at least one field device using the exemplary method of FIG. 2a.

FIG. 3a is a flowchart of a fourth exemplary embodiment of the method of the present invention.

FIG. 3b is a flowchart depicting examples of monitoring data which may be transmitted to a controller by the field device using the exemplary method of FIG. 3a.

DETAILED DESCRIPTION

Exemplary embodiments of the present invention and their advantages may be understood by referring to FIGS. 1a–3b, like numerals being used for like corresponding parts in the various drawings.

Figure 1A:
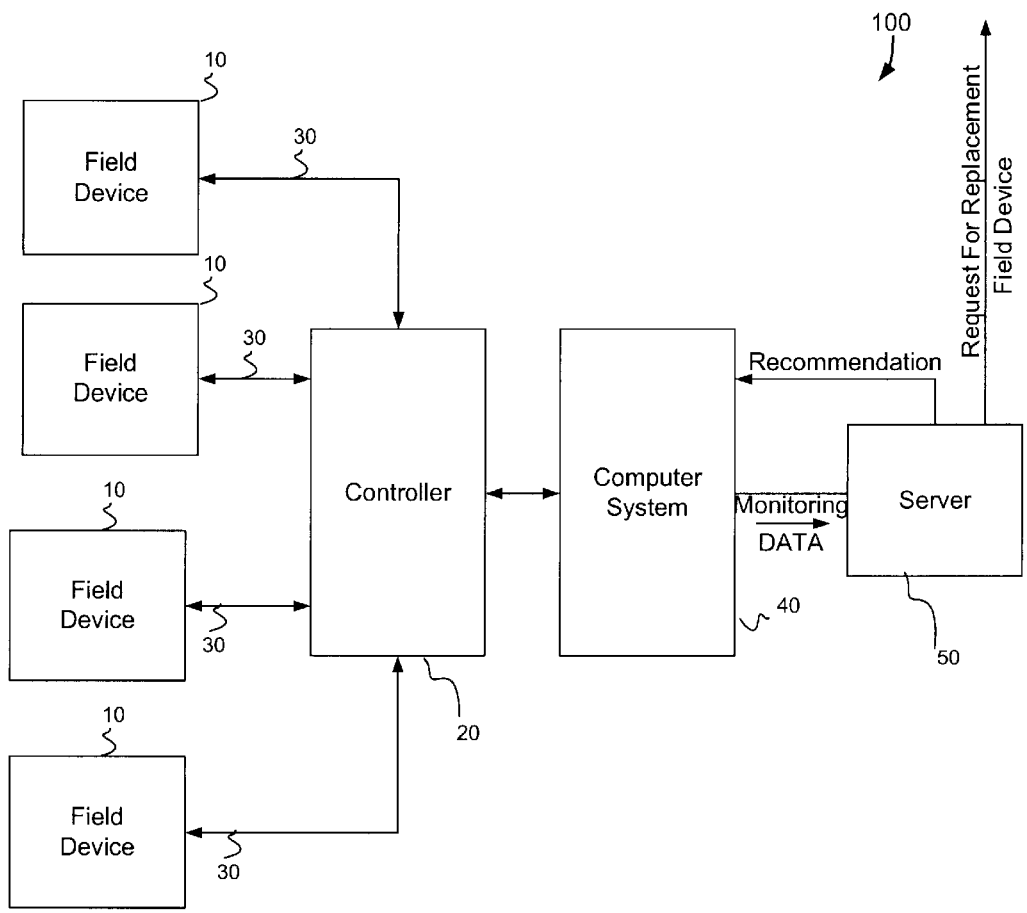
FIG. 1a is a schematic of an exemplary embodiment of a system according to the present invention.
Figure 1B:
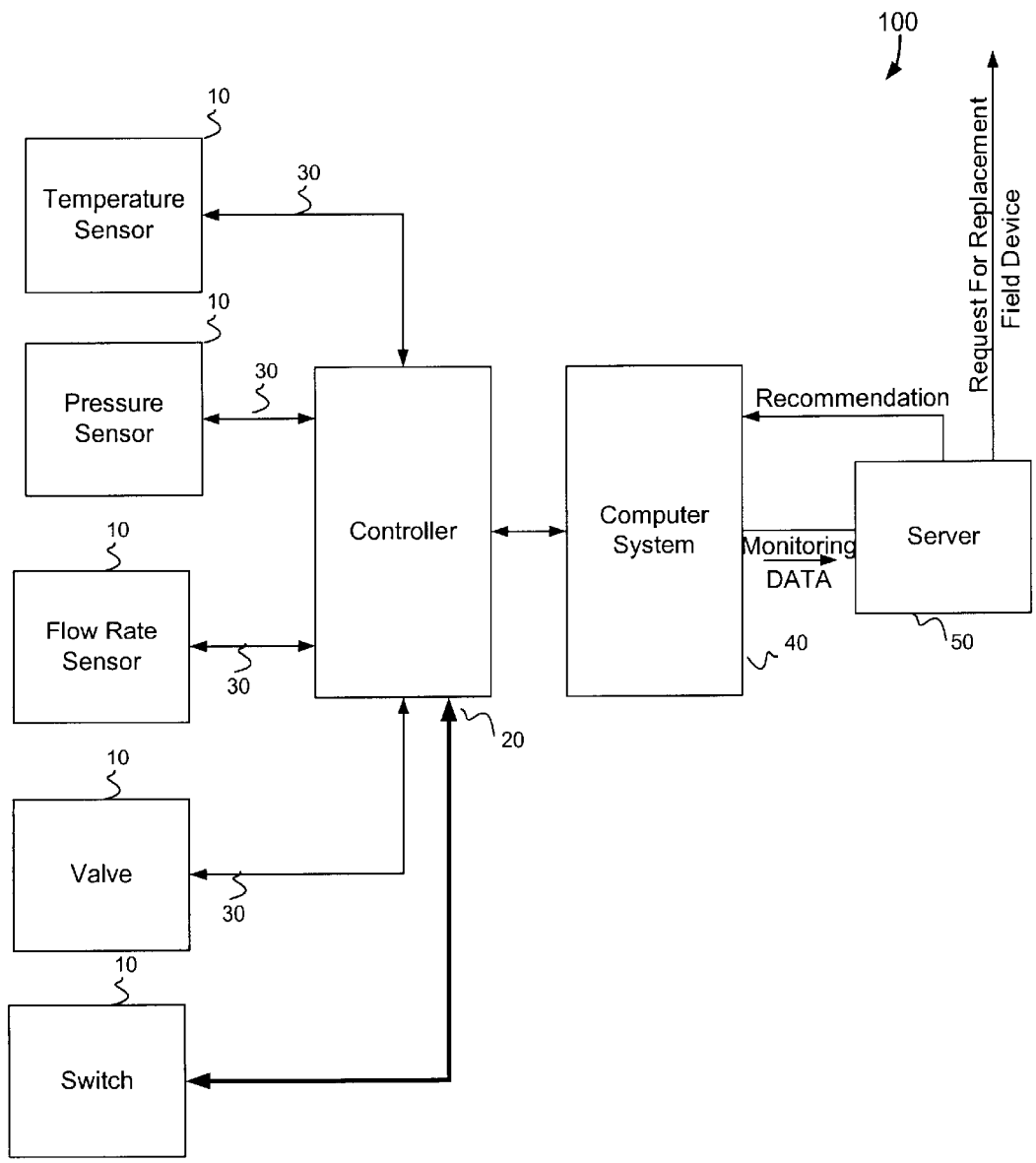
FIG. 1b is a flowchart of another exemplary embodiment of a system according to the present invention for monitoring a device or component.

In particular, as shown in FIG. 1a, an exemplary embodiment of a system 100 for maintaining devices and components according to the present invention is provided. The system 100 may include at least one field device 10 (e.g., at least one smart field device) positioned on a network, and each field device 10 may include a processor (not shown). Referring to FIG. 1b, which shows another exemplary embodiment of the system 100, each of the smart field devices 10 may be a sensor, a control element, etc. The sensor may be a temperature sensor, a pressure sensor, a flow rate sensor, etc., and the control elements can be a valve, a switch, etc. In operation, each of the field devices 10 may perform a function within the system 100. For example, a field device 10a which is a temperature sensor may measure a temperature of a liquid, a field device 10b which is a pressure sensor may measure pressure within a container, a field device 10c which is a flow rate sensor may measure a flow rate of the liquid, etc. Similarly, field devices 10d and 10e which are a valve and a switch, respectively, may open to allow for or increase the flow rate of the liquid, or may close to stop the flow of the liquid or to decrease the flow rate of the liquid. In an exemplary embodiment of the system 100 according to the present invention, each field device 10 may be communicatively coupled to at least one other field device 10 using an open smart communications protocol 30. Such open smart communications protocols may be HART®, PROFIBUS®, FOUNDATION® Fieldbus, etc.

Referring again to FIG. 1a, the system 100 also may include a controller 20. The controller 20 may have a processor (not shown), and also can be communicatively coupled to each field device 10 using the open smart communications protocol 30. The system 100 further may include a computer system 40 communicatively coupled to the controller 20. In an exemplary embodiment of the present invention, the computer system 40 may be communicatively coupled to the controller 20 using an Ethernet connection. In operation, each of the smart field devices 10 may collect monitoring data associated with a function block of that particular field device 10. For example, in a case when the field device 10 is a sensor, the monitoring data may include values associated with instantaneous temperatures, pressures, flow rates, etc. detected by the field device 10 at various times. When the field device 10 is a control element, the monitoring rate may include values associated with a position of the field device 10 at various times. Moreover, when the field device 10 is a sensor or a control element, the monitoring rate further may include values associated with historical data, e.g., the amount of time that the field device 10 has been in operation.

Further, the controller 20 and/or the field device 10 may be adapted to continuously calculate the average temperature, pressure, flow rate, etc., and to compare the most recently obtained instantaneous temperature, pressure, flow rate, etc. with the average temperature, pressure, flow rate, etc. respectively. The field device 20 and/or the controller 20 further may transmit the monitoring data to the computer system 40 when a difference between the instantaneous temperature, pressure, flow rate, etc. and the average temperature, pressure, flow rate, etc. is greater than a predetermined temperature, pressure, flow rate, etc. differential, respectively. Similarly, when the amount of time that the field device 10 has been in operation exceeds a predetermined amount of time, the field device 10 and/or the controller 20 may transmit the monitoring data to the computer system 40. The predetermined amount of time may be selected such that the field device 10 will not experience a substantial decrease in the efficiency prior to the expiration of the predetermined amount of time. As such, the monitoring data may be transmitted to the computer system 40 before the field device 10 experiences a decrease in efficiency. Such data transmission can be performed independently from, or in combination with, the performance of the field device 10.

In another embodiment of the present invention, the system 100 may further include at least one server 50. The server 50 can be communicatively coupled to the computer system 40. The server 50 may be adapted to access the monitoring data stored in the computer system 40, and to transmit a recommendation that maintenance be performed on the field device 10 or that the field device 10 should be replaced. Similarly, the server 50 can transmit a request to the manufacturer of the field device 10 requiring the delivery or installation of a replacement field device 10. For example, when the amount of time that the field device 10 has been in operation exceeds a predetermined amount value of time, the field device 10 and/or the controller 20 can transmit the monitoring data to the computer system 40. Thereafter, a user (not shown) of the server 50 can access the monitoring data stored in the computer system 40. The user of the server 50 also can transmit a recommendation for the maintenance to be performed on the field device 10, transmit a recommendation for the field device 10 to be replaced, request the delivery or the installation of a replacement field device 10, or combinations thereof. Similarly, when a difference between the instantaneous temperature, pressure, flow rate, etc. and the average temperature, pressure, flow rate, etc. is greater than the predetermined temperature, pressure, flow rate, etc., respectively, the field device 10 and/or the controller 20, can transmit the monitoring data to the computer system 40. Thereafter, the user of the server 50 can access the monitoring data stored in the computer system 40. As described above, the predetermined amount of time may be selected such that the field device 10 will not experience a substantial decrease in efficiency prior to the expiration of the predetermined amount of time.

Figure 2B:
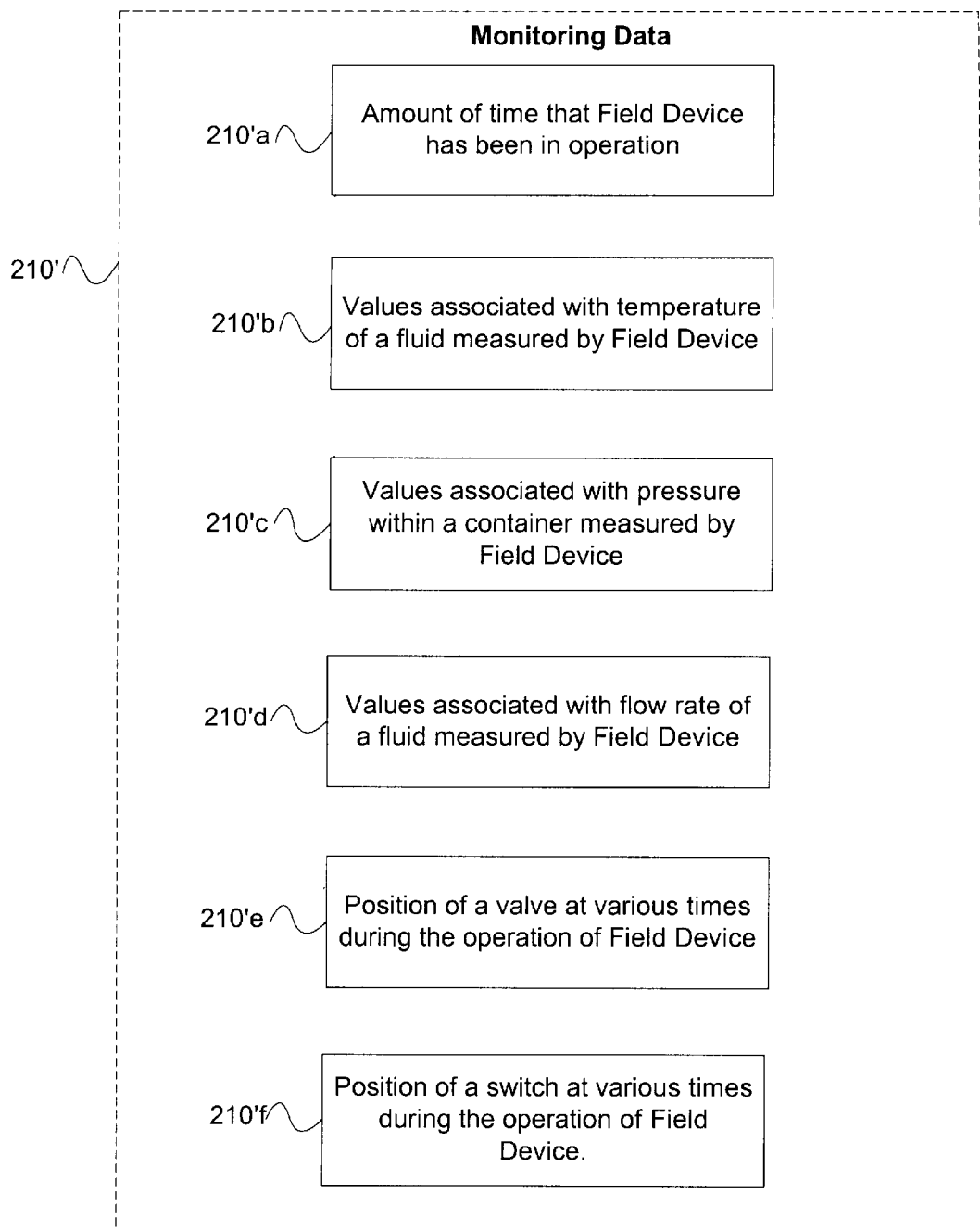
Figure 2C:
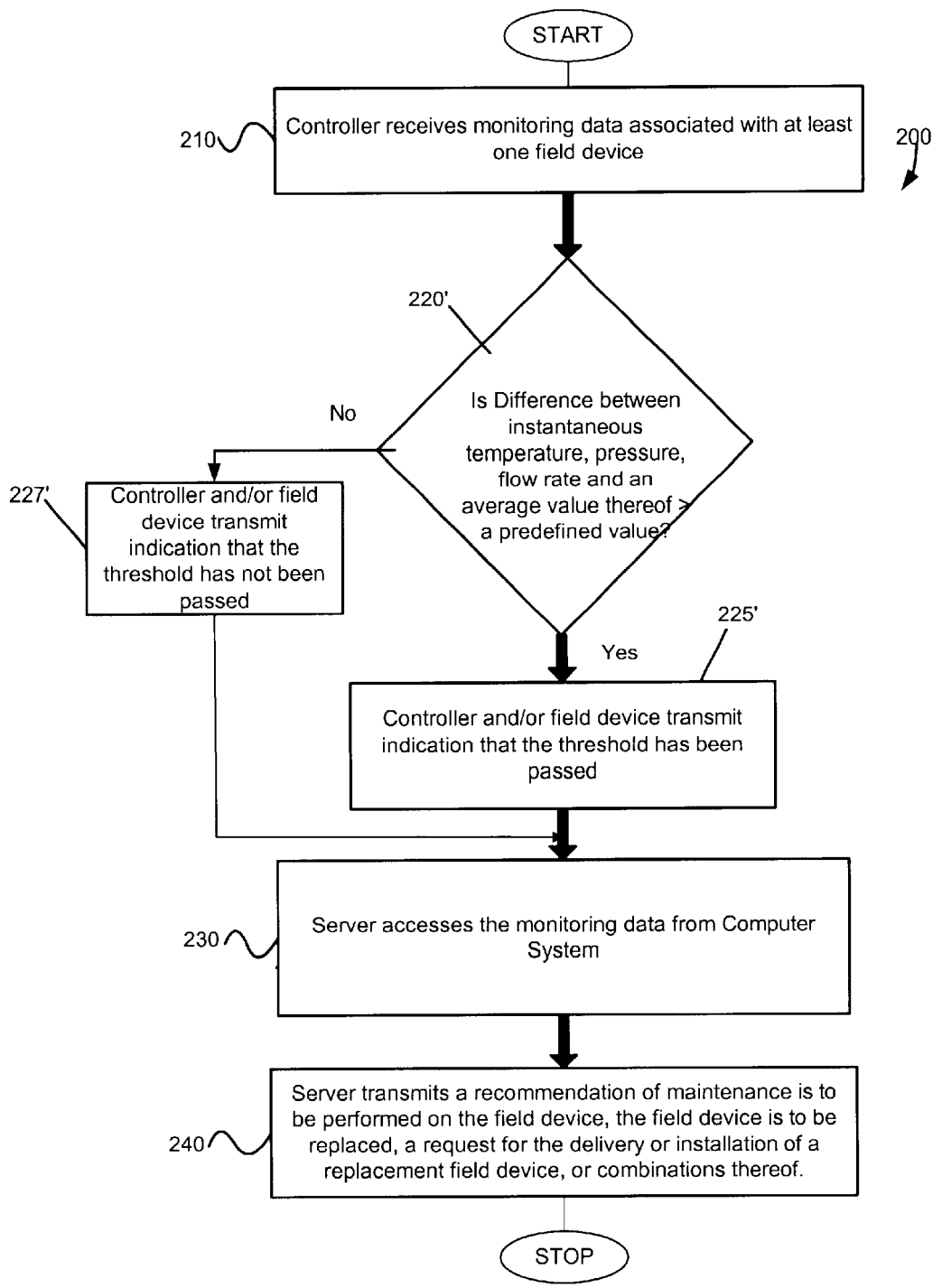
FIG. 2c is a flowchart of a second exemplary embodiment of the method according to the present invention.
Figure 2D:
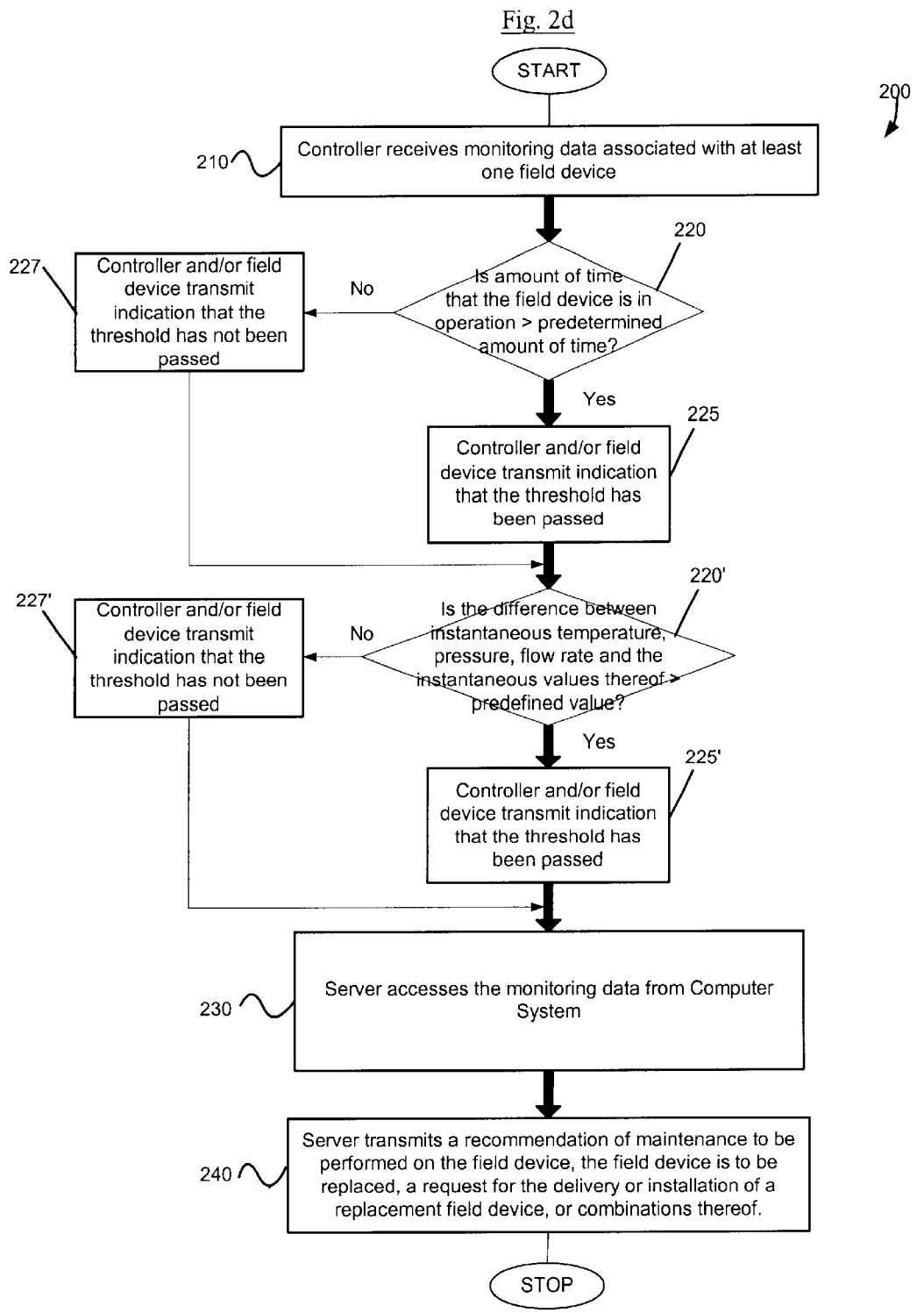
FIG. 2d is a flowchart of a third exemplary embodiment of the method according to the present invention.

Referring to FIG. 2a, an exemplary embodiment of a method 200 according to the present invention is depicted which can be utilized by the system 100 of FIG. 1a. In step 210, the controller 20 may receive monitoring data 210 associated with at least one field device 10. Referring to FIG. 2b, in a second exemplary embodiment of the method, the monitoring data can include any combination of the monitoring data 210*a*–210*f*. For example, the monitoring data can include any combination of the amount of time that the field device 10 has been in operation (block 210'*a*), values associated with a temperature of a fluid measured by the field device 10 (block 210'*b*), values associated with a pressure within a container measured by the field device 10 (block 210'*c*), values associated with a flow rate of a fluid measured by the field device 10 (block 210'*d*), a position of a valve at various times during the operation of the field device 10 (block 210'*e*), and a position of a switch at various times during the operation of the field device 10 (block 210'*f*). In step 220, the controller 20 and/or the field device 10 may determine the amount of time that the field device 10 has been in operation, and the controller 20 and/or the field device 10 may transmit the monitoring data 210 to the computer system 40 when the amount of time that the field device 10 has been in operation exceeds the predetermined amount of time (step 225). In addition, the controller and/or the field device may transmit another indication that the threshold has not been reached in step 227, if such determination was made in step 220. In another exemplary embodiment, referring to FIG. 2*c*, steps 220–227 may be replaced by steps 220'–227'. In step 220', the controller 20 may determine if a difference between the instantaneous temperature, pressure, flow rate, etc. and the average temperature, pressure, flow rate, etc. is greater than the predetermined temperature, pressure, flow rate, etc. differential, respectively. The indication of the determination is formulated by the field device and/or the controller (i.e. steps 225', 227'). Moreover, referring to FIG. 2*d*, in yet another exemplary embodiment, the method 200 may include steps 220–227 of FIG. 2*a*. and steps 220'–227'of FIG. 2*c*. In step 230, the server 50 may access the monitoring data from the computer system 40. Moreover, in step 240, the server 50 may transmit a recommendation for maintenance to be performed on the field device 10, the field device 10 is to be replaced, a request for the delivery and/or the installation of a replacement field device 10 to be made, etc. As such, maintenance may be performed on the field device 10 or the field device 10 may be replaced.

Figure 3B:
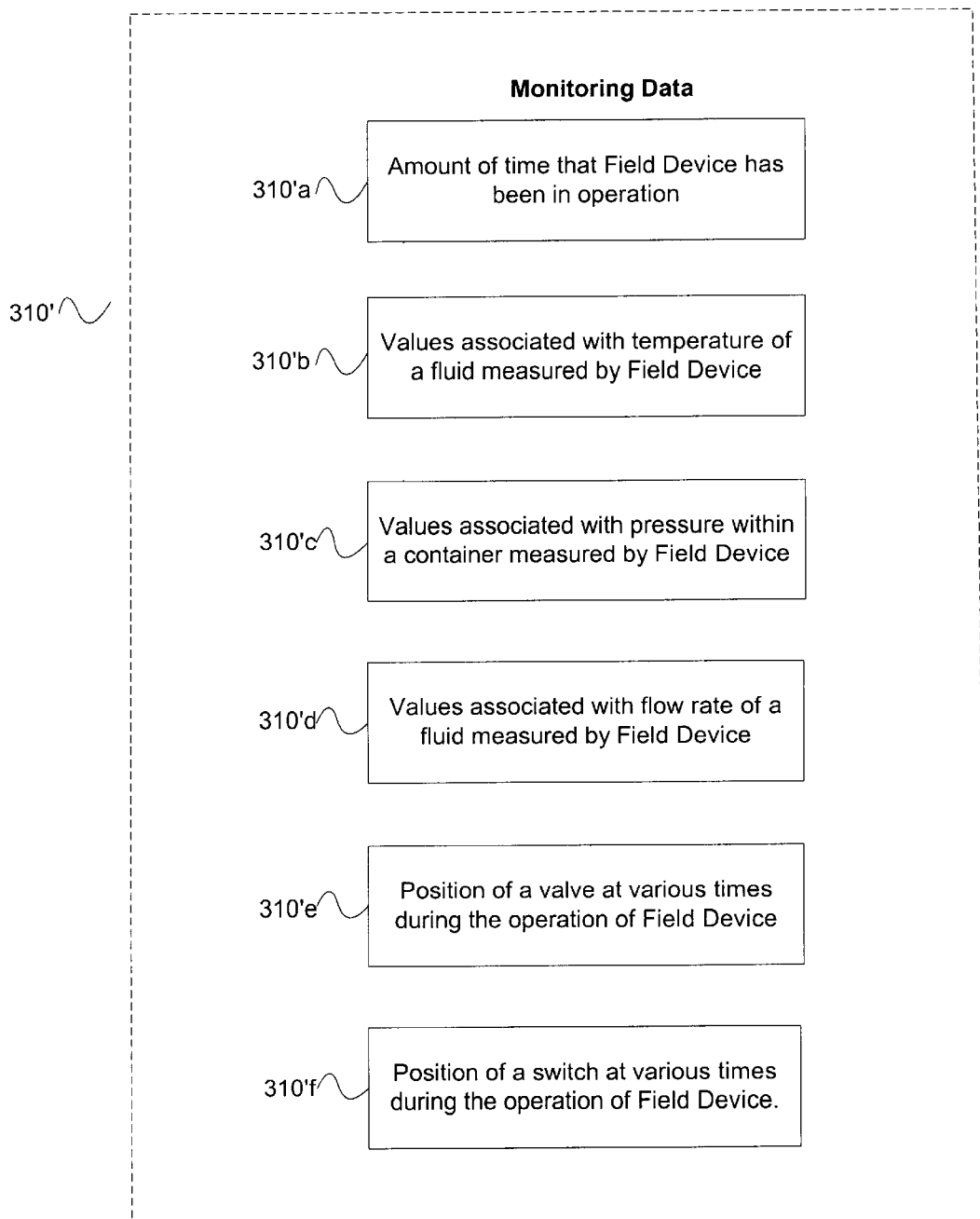

Referring to FIG. 3*a*, another exemplary embodiment of the method 300 according to the present invention which can be used by the system 100 of FIG. 1*a* is depicted. In step 310, the controller 20 may receive the monitoring data associated with the field device 10. Referring to FIG. 3*b*, in another embodiment of the method of the present invention, the monitoring data can include any combination of monitoring data 310*a*–310*f*. Specifically, the monitoring data can include any combination of the amount of time that at least one field device 10 has been in operation (block 310'*a*), values associated with a temperature of a fluid measured by the field device 10 (block 310'*b*), values associated with a pressure within a container measured by the field device 10 (block 310'*c*), values associated with a flow rate of a fluid measured by the field device 10 (block 310'*d*), a position of a valve at various times during the operation of the field device 10 (block 310'*e*), and a position of a switch at various times during the operation of the field device 10 (bock 310'*f*). In step 320, the controller 20 may transmit the monitoring data to the computer system 40. In step 330, the server 50 may access the monitoring data 310 from the computer system 40. Moreover, in step 340, the server 50 may transmit a recommendation for the maintenance to be performed on the field device 10, for the field device 10 to be replaced, a request for the delivery or the installation of a replacement field device 10, or combinations thereof. For example, the server 50 may transmit such recommendations and/or requests when the amount of time that the field device 10 has been in operation exceeds the predetermined amount of time. As such, maintenance may be performed on the field device 10, or the field device 10 may be replaced, independent from, or in combination with, the performance of the field device 10.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A system comprising:
   a controller communicatively coupled to at least one field device; and
   a computer system communicatively coupled to the controller, wherein at least one of the controller and the field device is adapted to transmit monitoring data associated with the at least one field device to the computer system when an amount of time that the at least one field device has been in operation is greater than a predetermined amount of time.

2. The system of claim 1, wherein the monitoring data includes the amount of time that the at least one field device has been in operation.

3. The system of claim 1, wherein the at least one field device includes at least one of a temperature sensor, a pressure sensor, a flow rate sensor, a valve and a switch.

4. The system of claim 3, wherein the monitoring data includes values associated with at least one measurement performed by the at least one field device, the at least one measurement including at least one of a temperature, pressure and flow rate.

5. The system of claim 4, wherein at least one of the field device and the controller is further adapted to compare an instantaneous temperature to an average temperature, and to transmit the monitoring data to the computer system when a difference between the instantaneous temperature and the average temperature is greater than a predetermined value.

6. The system of claim 4, wherein at least one of the field device and the controller is further adapted to compare an instantaneous pressure to an average pressure, and to transmit the monitoring data to the computer system when a difference between the instantaneous pressure and the average pressure is greater than a predetermined value.

7. The system of claim 4, wherein at least one of the field device and the controller is further adapted to compare an instantaneous flow rate to an average flow rate, and to transmit the monitoring data to the computer system when a difference between the instantaneous flow rate and the average flow rate is greater than a predetermined value.

8. The system of claim 3, wherein the monitoring data includes at least one of a position of the valve and a position of the switch at various times during the operation of the at least one field device.

9. The system of claim 1, further comprising a server communicatively coupled to the computer system, wherein the server is adapted to access the monitoring data and to transmit a request to replace the at least one field device when the amount of time that the at least one field device has been in operation is greater than the predetermined amount of time.

10. The system of claim 1, further comprising a server communicatively coupled to the computer system, wherein the server is adapted to access the monitoring data and to transmit a recommendation for maintenance to be performed on the at least one field device when the amount of time that the at least one field device has been in operation is greater than the predetermined amount of time.

11. The system of claim 1, wherein the at least one field device is at least one smart field device, and wherein the controller communicates with the at least one smart field device using an open smart communications protocol.

12. The system of claim 11, wherein the open smart communications protocol is a Foundation Fieldbus protocol.

13. The system of claim 11, wherein the open smart communications protocol is a PROFIBUS protocol.

14. The system of claim 1, wherein the computer system is communicatively coupled to the controller using an Ethernet connection.

15. A system comprising:
a controller communicatively coupled to at least one field device;
a computer system communicatively coupled to the controller, wherein the controller is adapted to transmit monitoring data associated with the at least one field device to the computer system; and
a server communicatively coupled to the computer system, wherein the server is adapted to access the monitoring data, and to transmit at least one of a request to replace the at least one field device and a recommendation for maintenance to be performed on the at least one field device, wherein the at least one of the request and recommendation is transmitted at least partially independently of a performance of the at least one field device.

16. The system of claim 15, wherein at least one of the field device and the controller is adapted to transmit the monitoring data to the computer system when an amount of time that the at least one field device has been in operation is greater than a predetermined amount of time.

17. The system of claim 16, wherein the monitoring data includes the amount of time that the at least one field device has been in operation.

18. The system of claim 15, wherein the at least one field device includes at least one of a temperature sensor, a pressure sensor, a flow rate sensor, a valve and a switch.

19. The system of claim 18, wherein the monitoring data includes values associated with at least one measurement performed by the at least one field device, the at least one measurement including at least one of a temperature, pressure and flow rate.

20. The system of claim 19, wherein at least one of the field device and the controller is further adapted to compare an instantaneous temperature to an average temperature, and to transmit the monitoring data to the computer system when a difference between the instantaneous temperature and the average temperature is greater than a predetermined value.

21. The system of claim 19, wherein at least one of the field device and the controller is further adapted to compare an instantaneous pressure to an average pressure, and to transmit the monitoring data to the computer system when a difference between the instantaneous pressure and the average pressure is greater than a predetermined value.

22. The system of claim 19, wherein at least one of the field device and the controller is further adapted to compare an instantaneous flow rate to an average flow rate, and to transmit the monitoring data to the computer system when a difference between the instantaneous flow rate and the average flow rate is greater than a predetermined value.

23. The system of claim 18, wherein the monitoring data includes at least one of a position of the valve and a position of the switch at various times during the operation of the at least one field device.

24. The system of claim 16, wherein the server is adapted to transmit the request for the at least one replacement field device when the amount of time that the at least one field device has been in operation is greater than the predetermined amount of time.

25. The system of claim 16, wherein the server is adapted to transmit the recommendation that maintenance be performed on the at least one field device when the amount of time that the at least one field device has been in operation is greater than the predetermined amount of time.

26. The system of claim 15, wherein the at least one field device is at least one smart field device, and wherein the controller communicates with the at least one smart field device using an open smart communications protocol.

27. The system of claim 26, wherein the open smart communications protocol is a Foundation Fieldbus protocol.

28. The system of claim 26, wherein the open smart communications protocol is a PROFIBUS protocol.

29. The system of claim 15, wherein the computer system is communicatively coupled to the controller using an Ethernet connection.

30. A method of monitoring at least one field device, comprising the steps of:
receiving monitoring data from the at least one field device, wherein the monitoring data is associated with the at least one field device; and
transmitting the monitoring data to a computer system when an amount of time that the at least one field device has been in operation is greater than a predetermined amount of time.

31. The method of claim 30, further comprising the step of determining whether the amount of time that the at least one field device has been in operation is greater than the predetermined amount of time, wherein the monitoring data includes the amount of time that the at least one field device has been in operation.

32. The method of claim 30, wherein the at least one field device includes at least one of a temperature sensor, a pressure sensor, a flow rate sensor, a valve and a switch.

33. The method of claim 32, wherein the monitoring data includes values associated with at least one measurement performed by the at least one field device, the at least one measurement including at least one of a temperature, pressure and flow rate.

34. The method of claim 33, further comprising the steps of:
comparing an instantaneous temperature to an average temperature; and
transmitting the monitoring data to the computer system when a difference between the instantaneous temperature and the average temperature is greater than a predetermined value.

35. The method of claim 33, further comprising the steps of:
comparing an instantaneous pressure to an average pressure; and
transmitting the monitoring data to the computer system when a difference between the instantaneous pressure and the average pressure is greater than a predetermined value.

36. The method of claim 33, further comprising the steps of:

comparing an instantaneous flow rate to an average flow rate; and transmitting the monitoring data to the computer system when a difference between the instantaneous flow rate and the average flow rate is greater than a predetermined value.

37. The method of claim 32, wherein the monitoring data includes at least one of a position of the valve or a position of the switch at various times during the operation of the at least one field device.

38. The method of claim 30, further comprising the steps of:

accessing the monitoring data; and transmitting a request to replace the at least one field device when the amount of time that the at least one field device has been in operation is greater than the predetermined amount of time.

39. The method of claim 30, further comprising the steps of:

accessing the monitoring data; and transmitting a recommendation for maintenance to be performed on the at least one field device when the amount of time that the at least one field device has been in operation is greater than the predetermined amount of time.

40. The method of claim 30, wherein the at least one field device is at least one smart field device, and wherein the controller communicates with the at least one field device using an open smart communications protocol.

41. The method of claim 40, wherein the open smart communications protocol is a Foundation Fieldbus protocol.

42. The method of claim 41, wherein the open smart communications protocol is a PROFIBUS protocol.

43. The method of claim 30, wherein the computer system is communicatively coupled to the controller using an Ethernet connection.

44. A method of monitoring at least one field device, comprising the steps of:

receiving monitoring data from at least one field device, wherein the monitoring data is associated with the at least one field device;

transmitting the monitoring data to a computer system; and forwarding at least one of a request to replace the at least one field device and a recommendation for maintenance to be performed on the at least one smart device at least partially, independently of a performance of the at least one field device.

45. The method of claim 44, further comprising the step of determining whether an amount of time that the at least one field device has been in operation is greater than a predetermined amount of time, wherein the step of transmitting the monitoring data to the computer system includes the step of transmitting the monitoring data to the computer system when the amount of time that the at least one field device has been in operation is greater than the predetermined amount of time.

46. The method of claim 44, wherein the monitoring data includes the amount of time that the at least one field device has been in operation.

47. The method of claim 45, wherein the at least one field device includes at least one of a temperature sensor, a pressure sensor, a flow rate sensor, a valve and a switch.

48. The method of claim 47, wherein the monitoring data includes values associated with at least one measurement performed by the at least one field device, the at least one measurement including at least one of a temperature, pressure and flow rate.

49. The method of claim 48, further comprising the steps of:

comparing an instantaneous temperature to an average temperature; and transmitting the monitoring data to the computer system when a difference between the instantaneous temperature and the average temperature is greater than a predetermined value.

50. The method of claim 48, further comprising the steps of:

comparing an instantaneous pressure to an average pressure; and transmitting the monitoring data to the computer system when a difference between the instantaneous pressure and the average pressure is greater than a predetermined value.

51. The method of claim 48, further comprising the steps of:

comparing an instantaneous flow rate to an average flow rate; and transmitting the monitoring data to the computer system when a difference between the instantaneous flow rate and the average flow rate is greater than a predetermined value.

52. The method of claim 47, wherein the monitoring data includes at least one of a position of the valve and a position of the switch over time during the operation of the at least one field device.

53. The method of claim 45, wherein the step of transmitting the request includes the step of transmitting the request when the amount of time that the at least one field device has been in operation is greater than the predetermined amount of time.

54. The method of claim 44, wherein the step of transmitting the recommendation includes the step of transmitting the recommendation when the amount of time that the at least one field device has been in operation is greater than the predetermined amount of time.

55. The method of claim 54, wherein the at least one field device is at least one smart field device, and wherein the controller communicates with the at least one smart field device using an open communications protocol.

56. The method of claim 55, wherein the open smart communications protocol is a Foundation Fieldbus protocol.

57. The method of claim 55, wherein the open smart communications protocol is a PROFIBUS protocol.

58. The method of claim 44, wherein the computer system is communicatively coupled to the controller using an Ethernet connection.

* * * * *